United States Patent
Katagishi et al.

(10) Patent No.: US 6,985,744 B2
(45) Date of Patent: Jan. 10, 2006

(54) CELLULAR PHONE AND A BASE STATION THEREOF

(75) Inventors: Makoto Katagishi, Tokyo (JP); Osamu Hasegawa, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 484 days.

(21) Appl. No.: 09/938,204

(22) Filed: Aug. 23, 2001

(65) Prior Publication Data

US 2002/0168997 A1 Nov. 14, 2002

(30) Foreign Application Priority Data

May 10, 2001 (JP) .............................. 2001-139445

(51) Int. Cl.
*H04M 1/00* (2006.01)
(52) U.S. Cl. ................ 455/456.1; 455/414; 455/550.1; 379/201.07; 379/201.08
(58) Field of Classification Search ............ 455/550.1, 455/456, 433, 560, 414; 379/201.01, 201.07, 379/201.08
See application file for complete search history.

(56) References Cited

U.S. PATENT DOCUMENTS

| | | | |
|---|---|---|---|
| 5,528,558 A | * 6/1996 | Mardhekar et al. | ........... 368/10 |
| 5,742,668 A | * 4/1998 | Pepe et al. | .................. 455/415 |
| 5,818,920 A | * 10/1998 | Rignell et al. | ......... 379/211.02 |
| 5,920,824 A | 7/1999 | Beatty et al. | |
| 6,075,992 A | 6/2000 | Moon et al. | |
| 6,138,008 A | * 10/2000 | Dunn et al. | .................. 455/417 |
| 6,223,058 B1 | * 4/2001 | Sudo et al. | .................. 455/564 |
| 2002/0168987 A1 | * 11/2002 | Wang et al. | ................. 455/456 |

FOREIGN PATENT DOCUMENTS

| | | |
|---|---|---|
| DE | 19804188 A1 | 8/1999 |
| EP | 0731621 A2 | 9/1996 |
| EP | 0783219 A2 | 7/1997 |
| EP | 1032186 A2 | 8/2000 |
| GB | 2284965 * | 6/1995 |
| JP | 06-276262 | 9/1994 |
| JP | 2000-324210 | 11/2000 |
| KR | 1999-0029329 | 7/1999 |
| KR | 2000-8413 | 2/2000 |

* cited by examiner

*Primary Examiner*—Fan Tsang
*Assistant Examiner*—Olisa Anwah
(74) *Attorney, Agent, or Firm*—Townsend and Townsend and Crew LLP

(57) ABSTRACT

When a receiving end is a cellular phone, the cellular phone that displays the local time at the receiving end and a base station used in this cellular phone are realized. A time recognition unit that obtains the local time at the receiving end using the time information acquired from the cellular phone of the receiving end or the base station at which the cellular phone of the receiving end is registered in stand-by mode and a display unit that displays the local time are installed in the cellular phone. Further, when the time information or position information of the cellular phone registered in the base station in stand-by mode is requested from the calling end, a unit for sending the time information or position information at the location at which this base station exists to the cellular phone of a requesting source is installed in the base station.

4 Claims, 16 Drawing Sheets

CELLULAR PHONE AND A BASE STATION THEREOF

BACKGROUND OF THE INVENTION

1. Technical Field of the Invention

The present invention relates to a cellular phone that can indicate the time-of-day (hereinafter referred to as time) and its base station, and, more particularly, to a cellular phone suitable for displaying the local time in a area where a recipient uses a cellular phone.

2. Description of Related Art

A cellular phone equipped with a clock circuit and a display screen and capable of displaying the time has come into wide use. However, in such cellular phone, the time displayed is only the time at the place where the user or calling party exists, and the time at a receiving end or a recipient could not be displayed. Accordingly, in the case of making a phone call in the United States where multiple time zones are provided within the country and making an international phone call, calls have been made without considering a time difference. As a result, such inconvenience has occurred that business could not be handled because the call was made not within the working hours of the receiving end.

As art that solves this problem, for example, as disclosed in JP-A No. H6-276262, there is a technique for calculating the local time at the receiving end from the telephone number of the receiving end and the local time at a caller. When a caller makes an international call, this technique identifies a country or an area of a recipient from the high-order digits within the international long-distance telephone number identification part of the recipient's telephone number and calculates the time difference between the identified country or area and the caller, and then calculates and displays the local time at the recipient, using the clock (matching the local time at the caller) inside the cellular phone and the calculated time difference.

In prior art, the local time can be displayed on the cellular phone. However, this technique is effective only when the receiving end is a fixed-line telephone, but any technique that is effective for making a call to the cellular phone is not disclosed.

In addition to the rapid spread of a cellular phone, due to an international roaming function that enables communication for a country where the services of the same method is being performed even if the cellular phone is carried out abroad, the probability that the recipient's phone is a cellular phone is inclined to increase more and more. This international roaming function has already been put in practical use in the Global System for Mobile communications (GSM) that is the cellular phone standard of Europe. Further, in the International Telecommunications Union (ITU), the standardization of a third-generation cellular phone system of which the target is the realization of cellular phone mobile units that mount the international roaming function and can be used in common in each country of the world is advancing.

When the international call between cellular phones is daily placed in this manner, it becomes very important information for the user or caller to know that the recipient is in which country and area now and what time the local time is. In particular, the cellular phone does not have any international long-distance telephone number identification part in a telephone number. Accordingly, when the user moves abroad or to an area of a different time zone with his or her cellular phone, it is very difficult to know the time at the place where the recipient exists, since the current position of the user cannot be known only from the telephone number of the cellular phone.

SUMMARY OF THE INVENTION

The present invention has been made in view of the above circumstances and provide a cellular phone that allows a caller to know the local time at the cellular phone of a recipient and has an excellent convenience. Further, the present invention has been made in view of the above circumstances and provides the cellular phone capable of making a call considering a condition of the receiving end by enabling the caller to select the call to be connected or disconnected.

According to an aspect of the present invention, the cellular phone has a time recognition unit that obtains the local time at the receiving end using the information acquired from the cellular phone of the receiving end or a base station at which the cellular phone is registered in stand-by mode in order to solve the above problem and a display unit that displays this recognized local time.

Further, according to another aspect of the present invention, the cellular phone has a clock circuit that can output time information, a time recognition unit that obtains the local time at the receiving end using position information acquired from the cellular phone of the receiving end or the base station at which the cellular phone is registered in stand-by mode and the time information, and a display unit that displays this recognized local time.

Furthermore, according to another aspect of the present invention, the base station is connected to the cellular phone at the base station end, and has a unit that sends the time information or position information at the location where the base station exists to the cellular phone of a requesting source according to the request of the time information or position information from the cellular phone of the receiving end.

Moreover, according to another aspect of the present invention, the cellular phone stores software that receives the time information or position information from the base station having a unit that sends the time information or position information at the location where the base station for the cellular phone exists to the cellular phone of the requesting source in accordance with a request from the cellular phone and recognizes and displays the local time at the recipient, and performs accounting regarding the storage or execution of this software.

According to another aspect of the present invention, the cellular phone allows an caller to know the local time at the cellular phone of the recipient and can obtain an excellent convenience. Further, according to another aspect of the present invention, the cellular phone is capable of making a call considering a condition of the receiving end by enabling the caller to select the call to be connected or disconnected.

BRIEF DESCRIPTION OF THE DRAWINGS

Preferred embodiments of the present invention will be described in detail based on the followings, wherein.

DETAILED DESCRIPTION OF THE EMBODIMENT

The embodiments of the present invention are described below with reference to the drawings.

Figure 1:
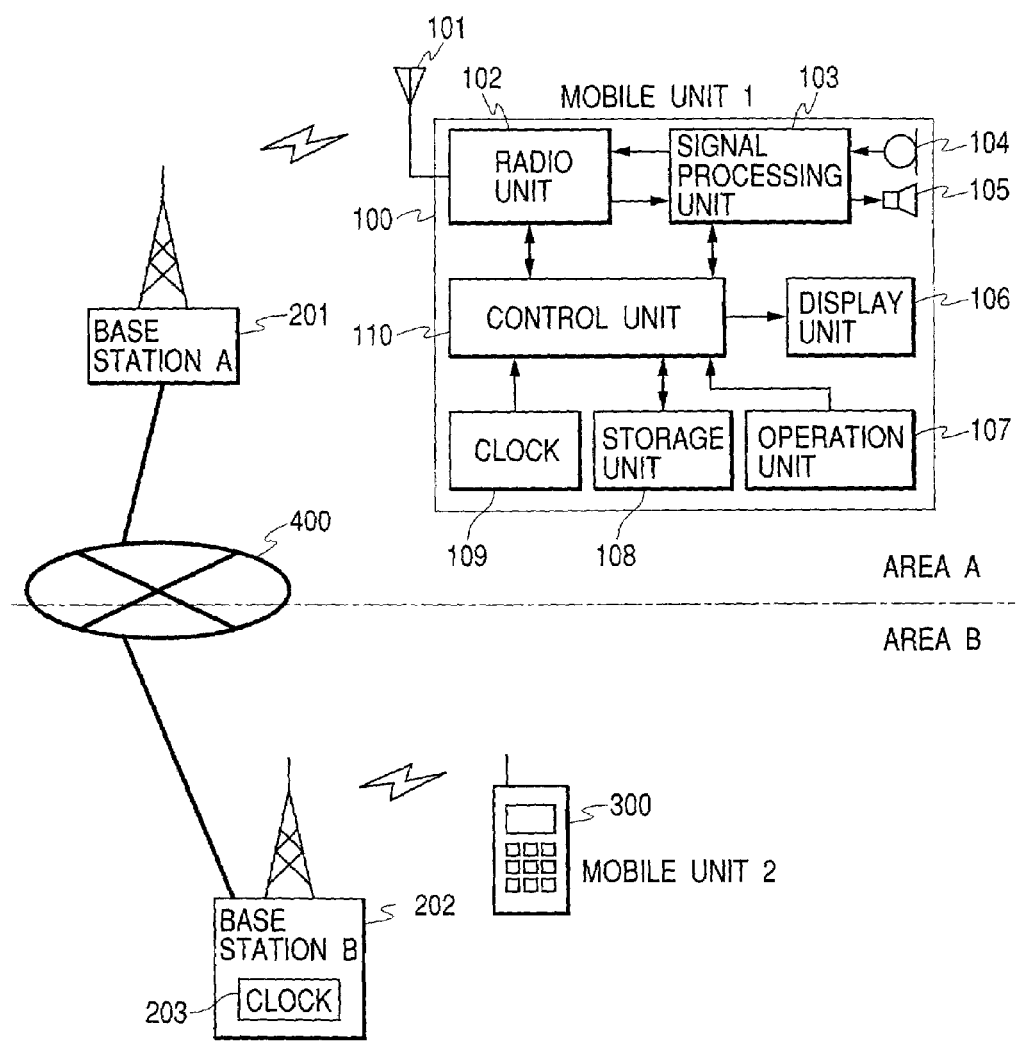
FIG. 1 is a drawing showing a block configuration and a system configuration of a cellular phone according to a first embodiment of the prevent invention.
Figure 13:
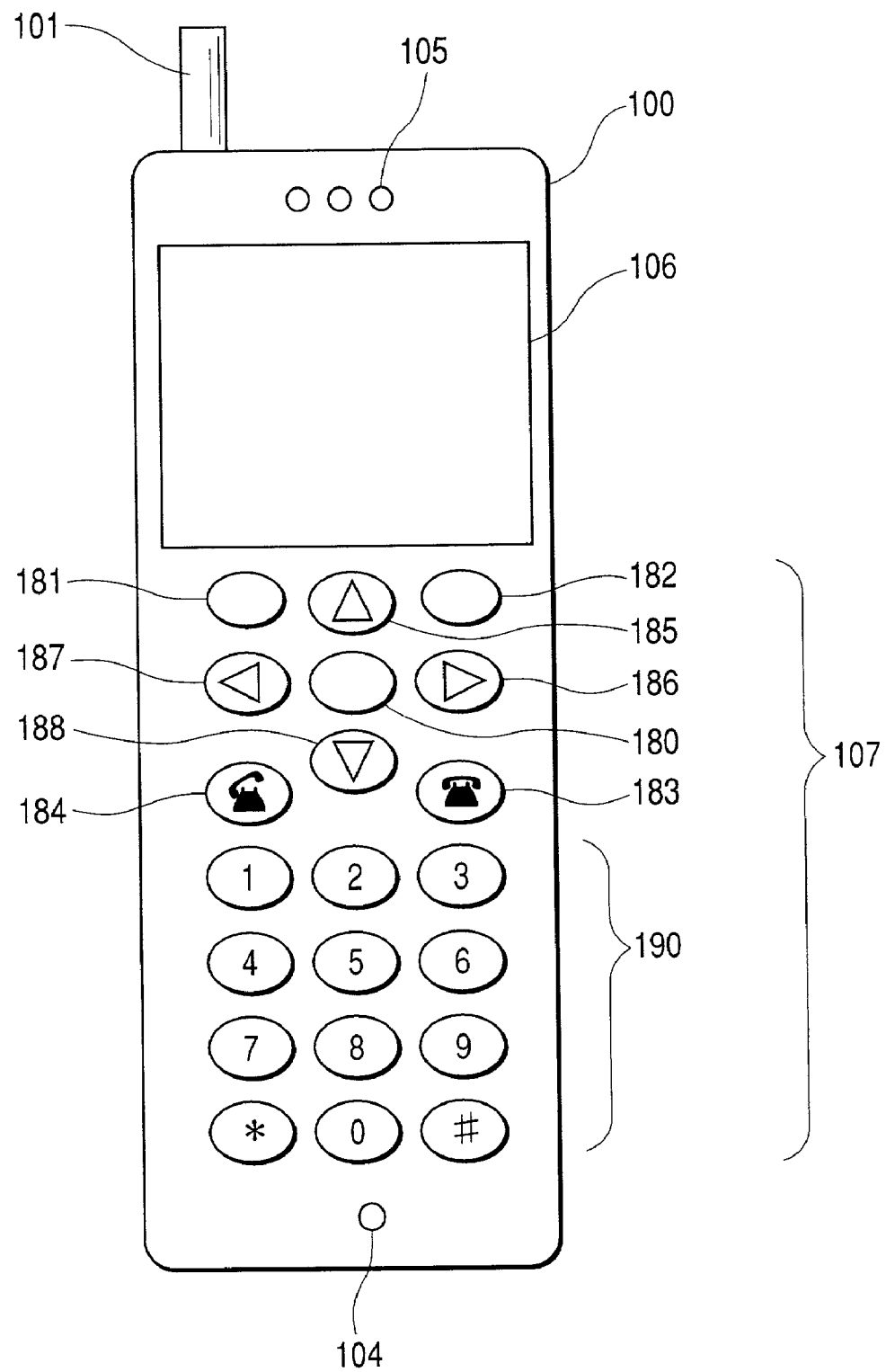
FIG. 13 is a front view showing an appearance of the cellular phone according to the first embodiment of the present invention.

A first embodiment of the present invention is described using FIGS. 1 to 4 and FIG. 13. FIG. 1 is a drawing showing a configuration of a cellular phone and a system configuration according to this embodiment. Further, FIG. 13 shows an appearance of the cellular phone according to this embodiment. Besides, FIGS. 1 and 13 also apply to another embodiment in common. A cellular phone 100 (hereinafter referred to as a mobile unit 1) of this embodiment has an antenna 101, a radio unit 102, a signal processing unit 103 that performs processing, such as coding and decoding, a microphone 104, a speaker 105, a display unit 106, an operation unit 107, a storage unit 108 that stores a telephone directory and various settings, a clock circuit 109, and a control unit 110 that controls these units. The operation unit 107 is provided with function keys 180 to 182, cursor move keys 185 to 188, a call end key 183, a dialing key 184, and an input key 190. The function keys 180 to 182 are assigned to various functions in accordance with the states and conditions in which the cellular phone is used. In this embodiment, the selection key function is assigned to the function key 180. The return key function that returns the display screen to previous one, for example, is assigned to the function key 181, and the sub menu key function having the sub menu selection function, for example, is assigned to the function key 182. Among the cursor move keys, 185 is the cursor upward move key, 186 is the cursor rightward move key, 187 is the cursor leftward move key, and 188 is the cursor downward move key. Besides, the words of upward, downward, leftward, and rightward described here correspond to the top, bottom, left, and right when the cellular phone 100 is viewed so that the speaker 105 will be located at the top and the microphone 104 will be located at the bottom in FIG. 13. The input key 190 has ten numeric keys of 0 to 9, the * (asterisk) key, and the # (sharp) key. These keys are used for inputting data necessary for the communication function and the browser function, such as mail text or retrieval keywords in addition to the input of a telephone number and a mail address. The hardware configuration is the same as that of a general cellular phone. However, this embodiment is characterized in the control method.

Figure 2:
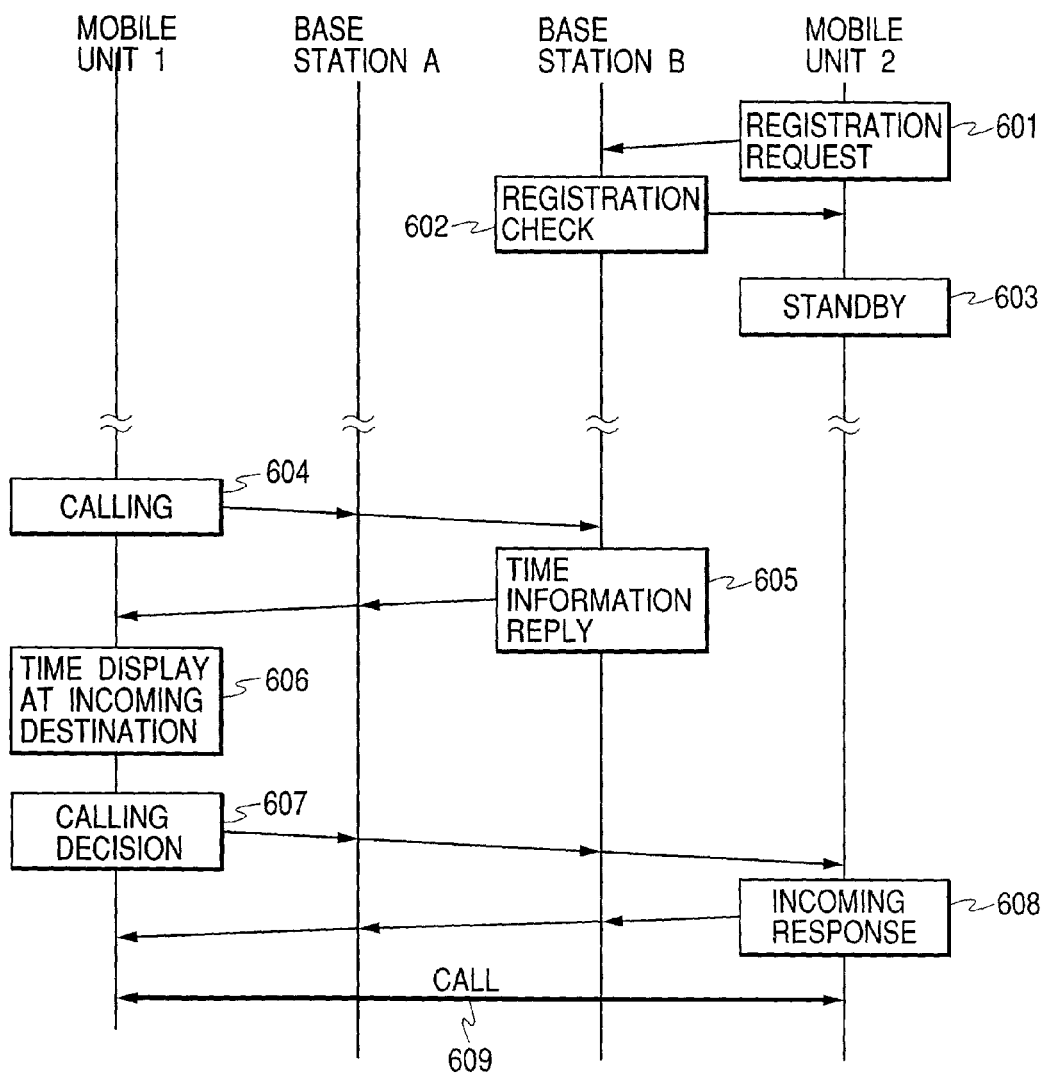
FIG. 2 is a sequence diagram showing an example of the operation according to the first embodiment of the present invention.
Figure 3:
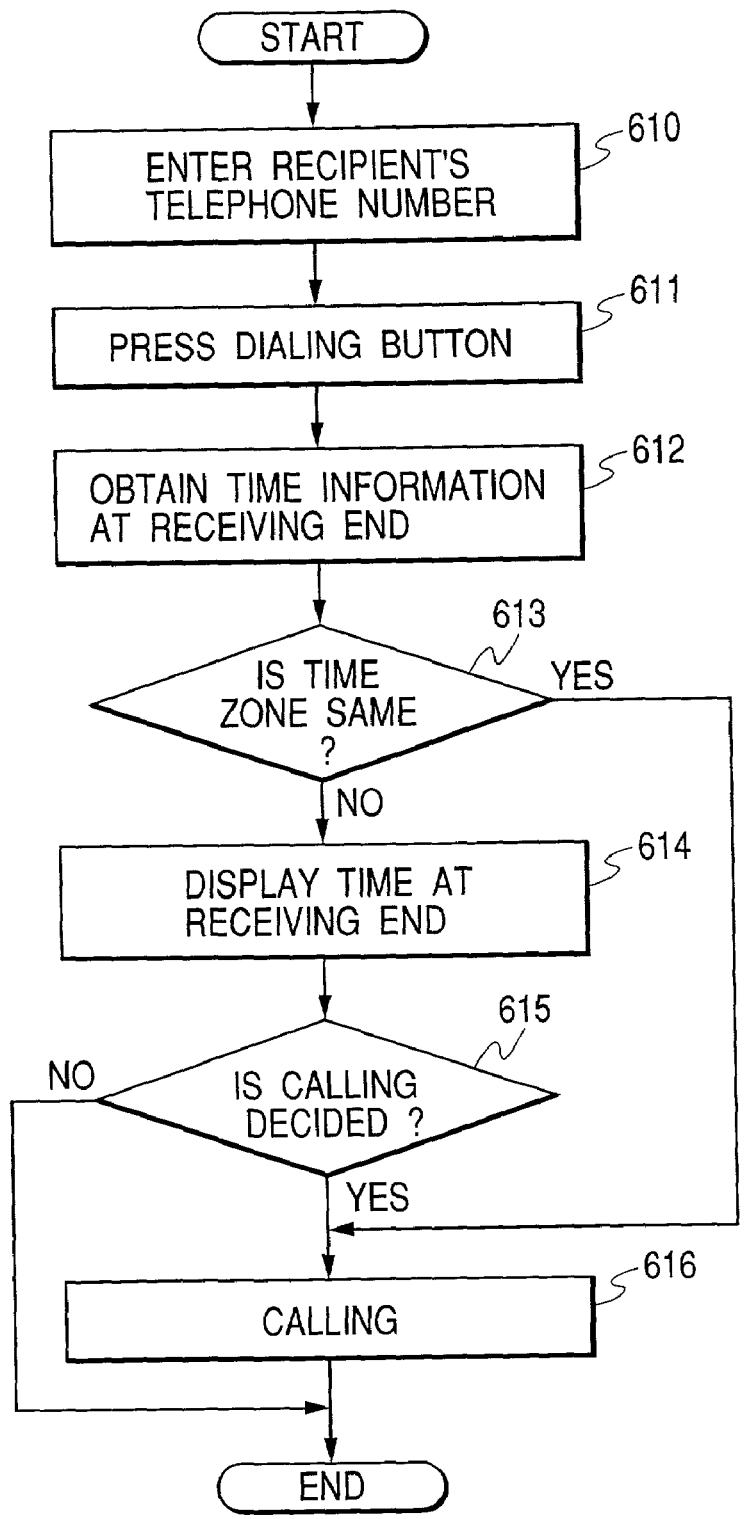
FIG. 3 is a flowchart showing an example of the operation of the cellular phone according to the first embodiment of the present invention.

Now, the case is considered where the mobile unit 1 is registered in a base station A that is installed in an area A in which it is connected to a communication network 400, and is connected to a cellular phone 300 (hereinafter referred to as a mobile unit 2) that is registered in a base station B installed in another time zone. An example of the procedure until the mobile unit 1 displays the local time at the mobile unit 2 is shown in FIG. 2. First, the mobile unit 2 performs registration in the nearest base station B and enters the stand-by operation (601 to 603). The base station B has a clock circuit 203 and this clock circuit matches the local time in an area B. Further, when the transmitting unit of the base station B has the function of sending this local time to a requesting source as clock information when a request for sending it is made from the calling end. When the mobile unit sends a message to the mobile unit 2, the user enters the telephone number of the mobile unit 2 from the operation unit 107 or calls this number if it is previously registered in the storage unit 108, and then presses the dialing button 184 provided in the operation unit 107. To perform calling processing, the control unit of the mobile unit 1 performs the processing that requests the base station B at which the mobile unit 2 that is a receiving end is registered to return the local time information instead of immediately connecting to the mobile unit 2. The base station B that receives this request returns the local time information in the area B in which the mobile unit 2 exists from the clock circuit installed in the local station to the mobile unit 1 that is the requesting source. The local time information described here can be the time itself, the time difference information for the mobile unit 1, and the time zone information.

Figure 4:
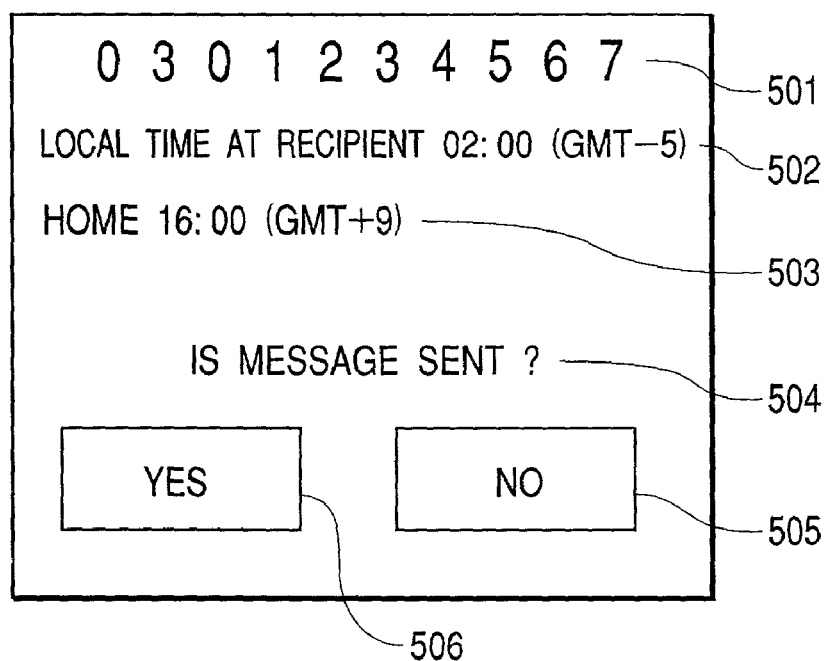
FIG. 4 is a front view showing an example of the display of the cellular phone according to the first embodiment of the present invention.

The mobile unit 1 that obtains the local time information of the receiving end recognizes the local time using the control unit 110 and the signal processing unit 103 and the control unit 110 controls the display unit 106 so as to display the local time at the receiving end. That is, in this embodiment, the control unit 110 and the signal processing unit 103 have the function as the time recognition unit. However, either the control unit 110 or the signal processing unit 103 alone may also be able to recognize the time. If the local time information of the receiving end is a time zone, for example, a lookup table in which the time difference between the time zones is collected in the storage unit 108 is previously stored and the receiving end time information may also be calculated from the time represented by the clock circuit 109 of the local station and the time difference information referred to from the lookup table. The control unit 110 of the mobile unit performs control so as to display the selection screen that selects whether to send a message or not on the display unit 106 after it displays the local time at the receiving end. The user of the mobile unit 1 inputs whether to send the message to the mobile unit 2 as is using the operation unit 107 referring to the local time at the mobile unit 2 displayed on the display unit 106. When the user of the mobile unit 1 decides calling, the control unit of the mobile unit 1 performs the processing that requests the base station B at which the mobile unit 2 that is the receiving end is registered to connect to the mobile unit 2. The base station B that receives this request performs incoming processing to the mobile unit 2, and performs processing that connects a mobile unit line so as to start a call with the mobile unit 1 if an incoming response is made from the mobile unit 2, The above processing procedure in the mobile unit 1 is stored in the storage unit 108. The control unit 110 calls this procedure and executes processing. FIG. 1 is a drawing showing an example of the processing of the mobile unit 1. When the mobile unit 1 sends a message, the user enters the telephone number of the mobile unit 2 from the operation unit 107 (step 610), and subsequently presses the dialing button 184 installed in the operation unit (step 611). The control unit 110 performs the processing that acquires the local time information of the recipient from the base station at which the cellular phone of the recipient is registered as described above (step 612). Next, the control unit 110 decides whether the acquired local time matches the time zone of the mobile unit 1 (step 613). When the former matches the latter (step 613-Y), the control unit 110 performs the same processing as normal calling. When the former differs from the latter (step 613-N), the control unit 110 displays the local time at the receiver on the display unit 106 (step 614), as shown in FIG. 4, and then performs control so as to display the screen that selects the advisability of calling decision on the display unit 106 (step 615). The control unit 110 performs calling processing (step 616) if the input from the display unit 106 is the calling decision (step 615-Y) and terminates the processing with the end of calling processing (step 900), and then returns to the stand-by state. If the input is calling suspension (step 615-N), the control unit 110 terminates the processing (step 900) and returns to the stand-by state without performing the calling processing.

In the steps 614 and 615, as shown in FIG. 4, the display unit 106 of the mobile unit 1 displays a telephone number 501 of the receiving end, local time 502 of the recipient, the time 503 of the local station, a display 504 that inquires the user about the advisability of calling, and selection items (505 and 506). The selection items are selected by moving the cursor to either the button 505 or 506 on the display screen and operating the selection key 180 or by making the buttons 505 and 506 correspond to the function key or numeric key (for example, 506 indicates the "1" key for YES and 505 indicates the "3" key for NO) and performing the input operation of the keys that correspond to the buttons 505 and 506. In this embodiment, although the local time 502 of the recipient and the time 503 of the local station are digitally displayed, they may also be displayed in the form of an analog clock. Further, a time zone may also be represented according to the colors of the illumination from behind the display screen (hereinafter referred to as backlight) and light emitting diode (not shown in the drawing) of the display unit. A date may also be displayed in addition to the time. Moreover, the control unit 110 may also control the reporting of the time to an caller so as to perform voice synthesis by the signal processing unit 103 instead of using the display unit 106 and perform voice reporting using the speaker 105. That is, the signal processing unit 103, the speaker 105, and the control unit 110 have the reporting unit function.

According to this embodiment, since the cellular phone user can know the local time at the recipient before connecting communication and can perform a call in consideration of the circumstances of the recipient, the convenience is improved. Further, when the local time display of the recipient is checked and the caller suspends calling, there is an advantage that the calling can be suspended without ringing the cellular phone of the recipient and no trouble will be caused to the recipient.

Figure 5:
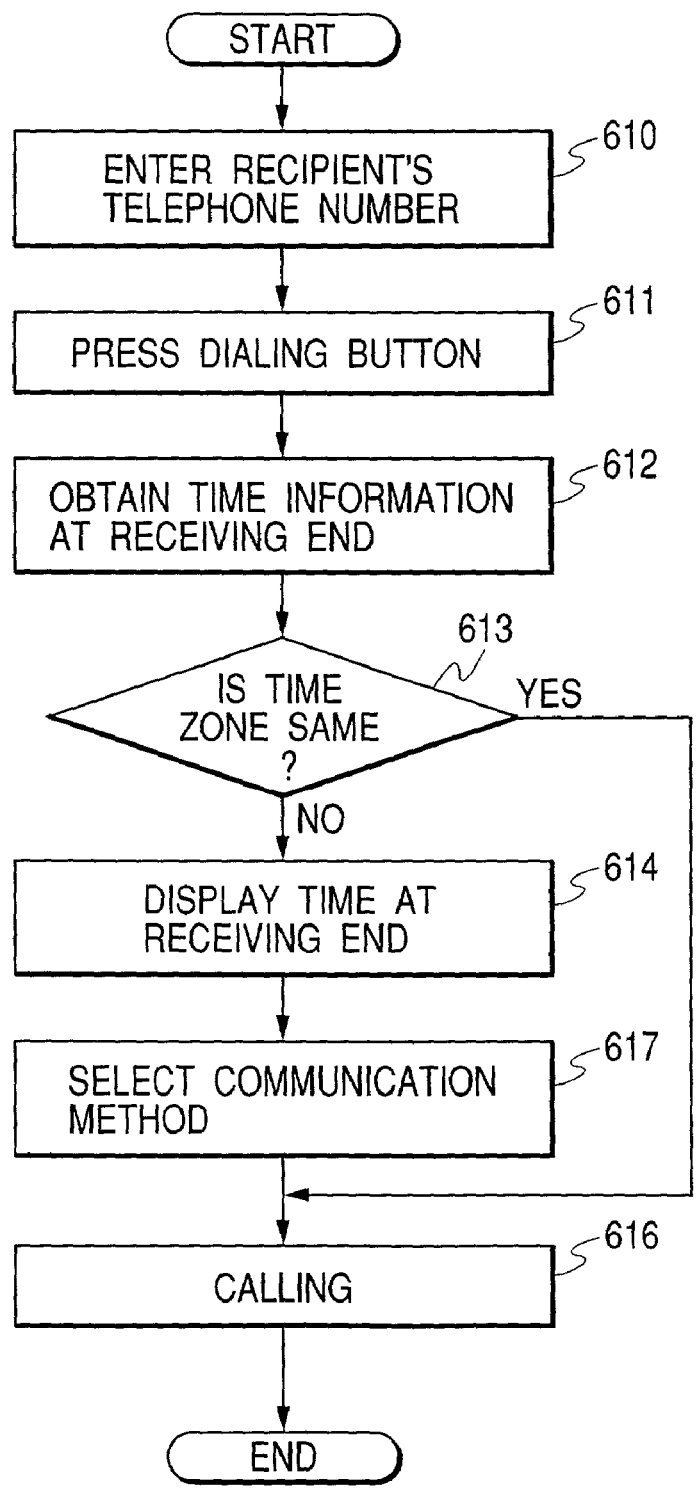
FIG. 5 is a flowchart showing an example of the operation of the cellular phone according to a second embodiment of the present invention.
Figure 6:
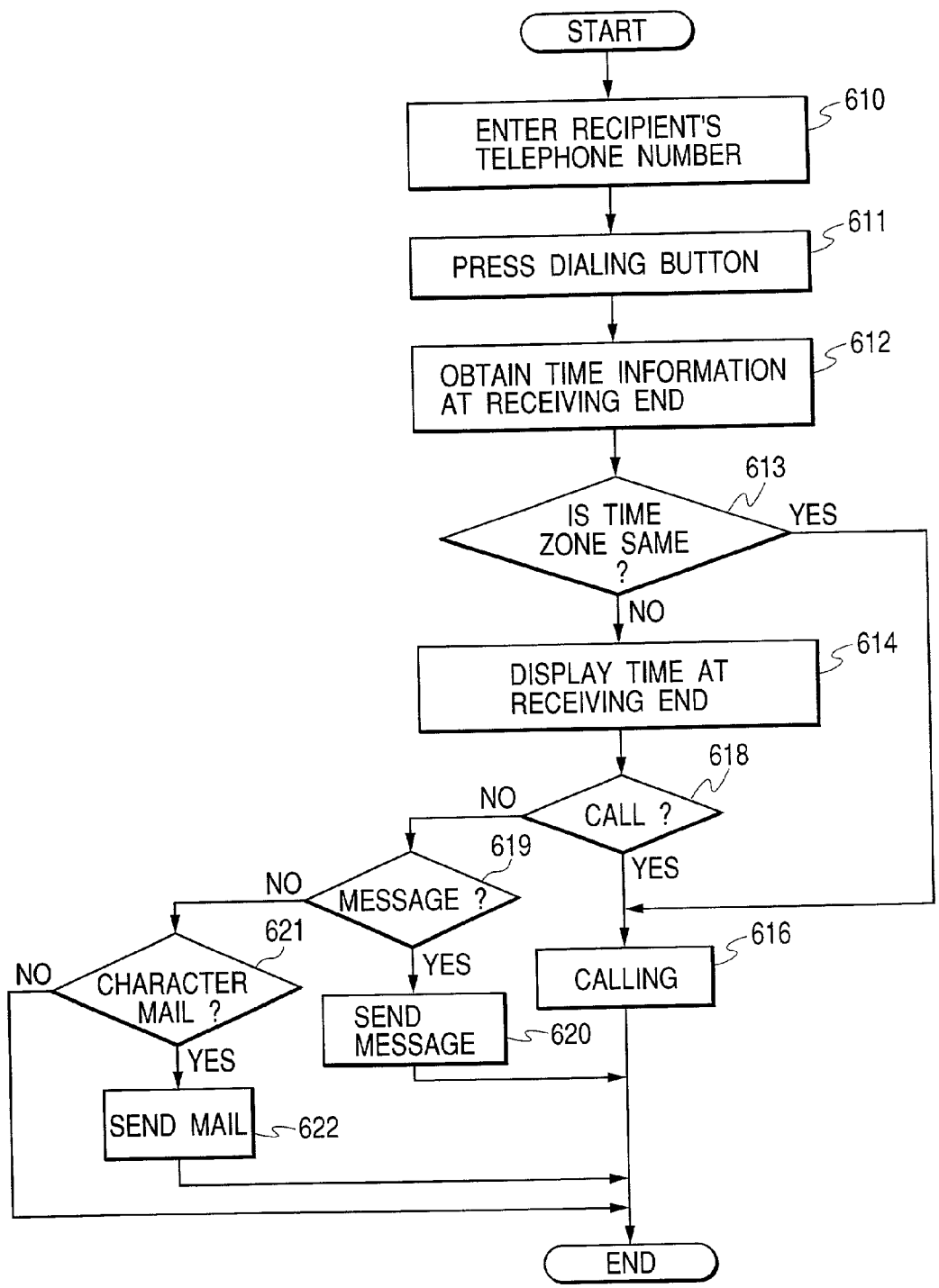
FIG. 6 is a flowchart showing another example of the operation of the cellular phone according to the second embodiment of the present invention.
Figure 7:
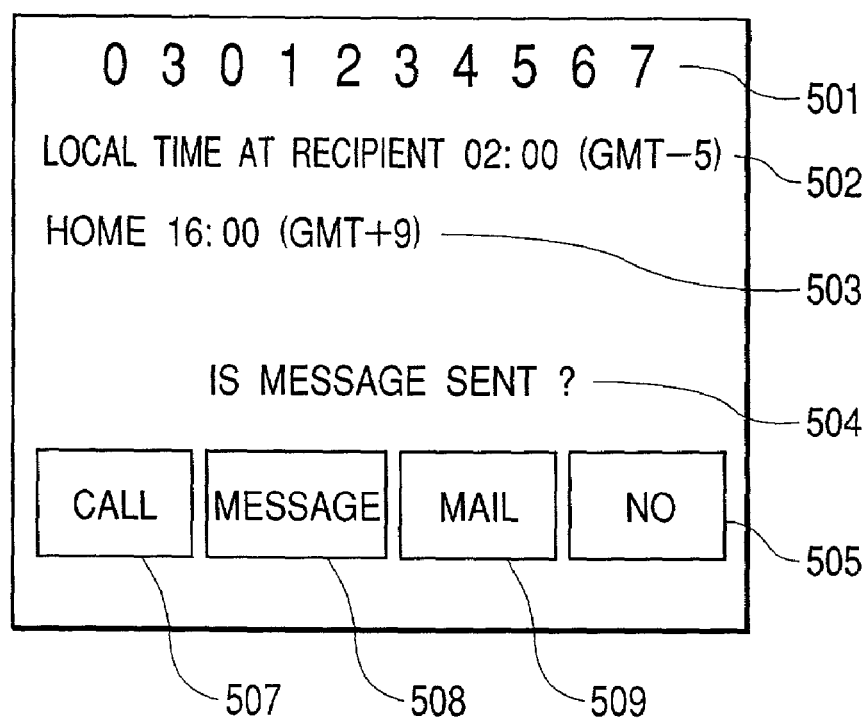
FIG. 7 is a front view showing an example of the operation of the cellular phone according to the second embodiment of,the present invention.

A second embodiment of this embodiment is described using FIGS. 5 to 7. FIG. 5 shows a drawing showing the operation of a cellular phone according to this embodiment. This embodiment enables selection of a communication method for the recipient instead of selecting the advisability of calling in the first embodiment. The current cellular phone can use multiple communication methods, such as electronic mail and a message, in addition to a voice call. If these methods are properly used in accordance with the time of the receiving end, business can be conveyed matching the circumstances of the recipient and convenience is greatly improved. The processing procedure in the cellular phone is described below. When the mobile unit 1 sends a message, the user enters the telephone number of the mobile unit 2 from the operation unit 107 (step 610), and then presses the dialing button 184 installed in the operation unit (step 611). The control unit 110 performs the processing that acquires the local time information of the recipient from the base station at which the cellular phone of the recipient is registered (step 612), as described above. The control unit 110 decides whether the acquired local time matches the time zone of the mobile unit 1 (step 613). When the acquired local time matches the time zone of the mobile unit 1 (step 613-Y), the control unit 110 performs the same processing as the normal calling (step 616). When the former does not match the latter (step 613-N), the control unit 110 displays the local time at the recipient (step 614). The above processing is identical with that of the first embodiment. This embodiment differs in that the control units 110 controls the display unit 106 so as to display the screen that selects a communication method (step 617) following the display (step 614) of the local time at the recipient (step 617).

Next, an example of the communication method selection processing in the step 617 is described in detail using FIG. 6. As shown in FIG. 7, the time of the local station and the local time at the recipient are displayed on the display unit 106 and the screen that selects whether to perform a normal call or not (steps 618, 619, and 621) and the selection result is inquired the user of using the operation unit 106. In this embodiment, as shown in FIG. 7, the selection item of the answer, such as the "Call" (507), "Message" (508), "Mail" (509) or "NO" (505) is displayed on the display screen as a button against the display (504) of the inquiry of "Is a message sent ?". The selection item is selected by moving the cursor to any one of the buttons 505, 507, 508, and 509 on the display screen and operating the selection key 180 or making the buttons 505, 507, 508, and 509 correspond to the function key or numeric key (for example, the "1" key for the "Call" (507), the "2" key for the "Message" (508), the "3" key for the "Mail" (509), and the "6" key for the "NO" (505) and performing the input operation of the key that corresponds to the buttons 505, 507, 508, and 509.

When the selection result input from the operation unit 107 is the call (step 618-Y), the calling processing of a normal call is performed (step 616), and when it is the message (steps 618-N and 619-Y), the processing that sends a message is performed (step 620). When it is the character mail(steps 619-N and 621-Y), the processing that sends mail is performed (step 622). When the steps 616, 620, and 622 are terminated, the processing terminates and returns to the stand-by state. When the selection result is "NO" (505) (steps 618-N, 619-N, and 621-N), the processing terminates without performing any of the call calling processing, message calling processing, and mail sending processing. Also in this case, after the processing terminates, the processing returns to the stand-by state. In FIG. 7, the selection items of these communication methods are displayed on the display unit 106 at a time. When the display space of the display unit 106 is narrow, the communication methods may also be selected sequentially according to the method selected with YES/NO in the order of the steps 618, 619, and 621. The above processing procedure is stored in the storage unit 108. The control unit 110 calls this procedure and executes the processing. As the selection of the processing method, for example, the control unit 110 selects the method that displays the selection items at a time by default, and may also be able to select the method that is sequentially selected according to the preference of the user.

According to this embodiment, the user of the cellular phone can know the local time at the recipient before connecting communication and enables a call in consideration of the circumstances of the recipient. Further, there is an advantage that the user can select multiple communication methods, such as electronic mail and a message matching the time of the receiving end and business can correctly be conveyed in accordance with the circumstances of the recipient.

Figure 8:
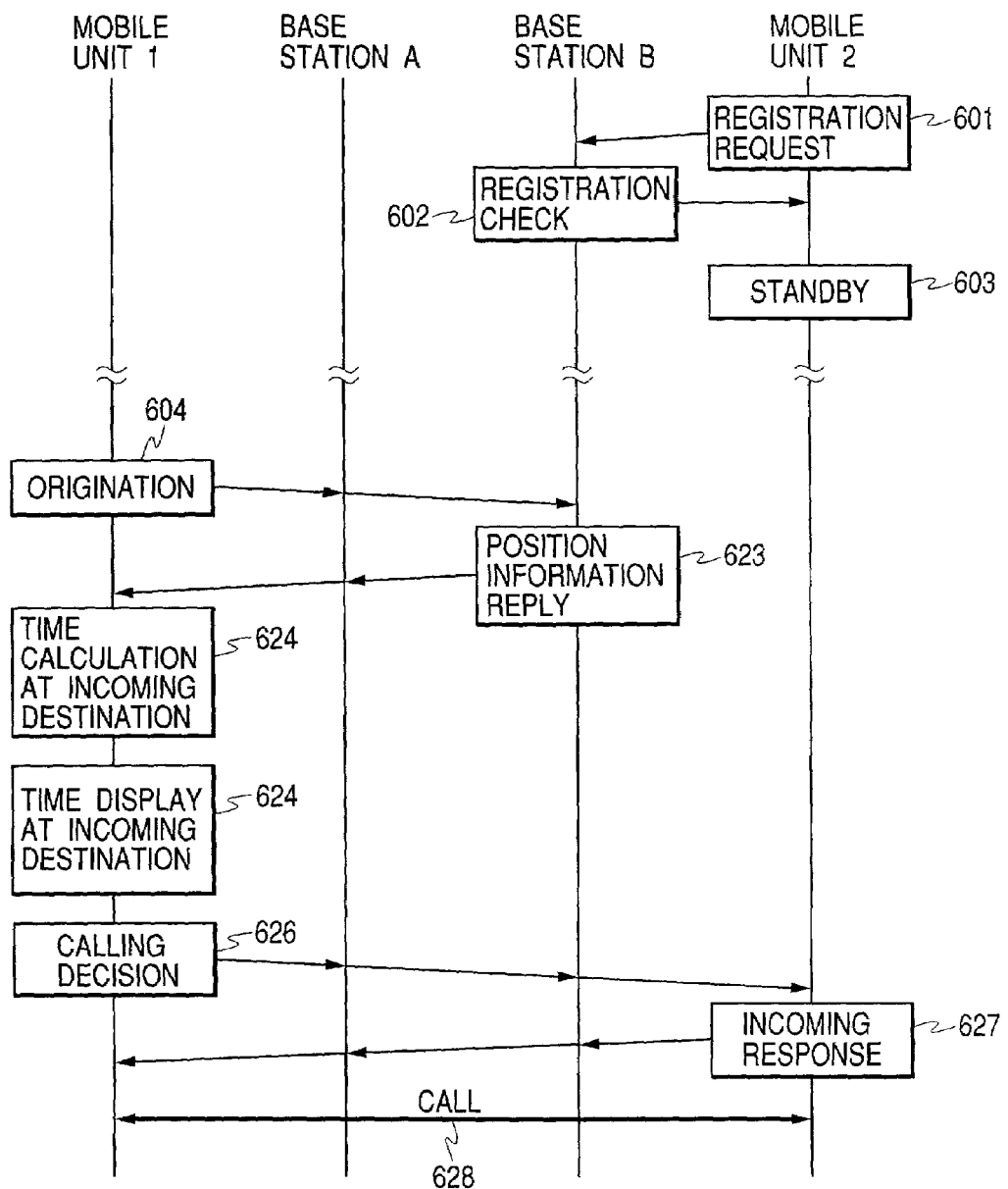
FIG. 8 is a sequence diagram of an example of the operation according to a third embodiment of the present invention.
Figure 9:
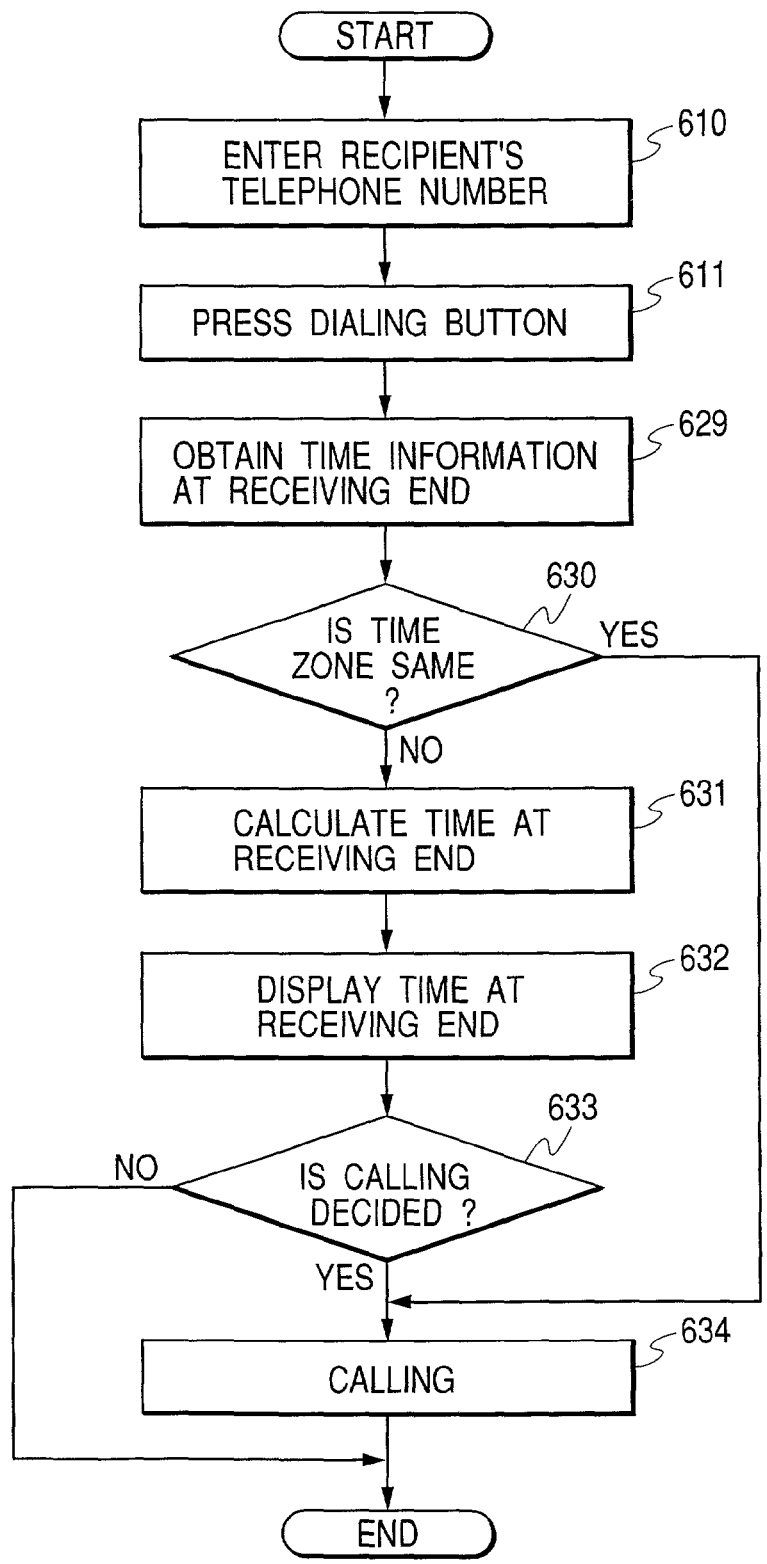
FIG. 9 is a flowchart showing an example of the operation of the cellular phone according to the third embodiment of the present invention.
Figure 10:
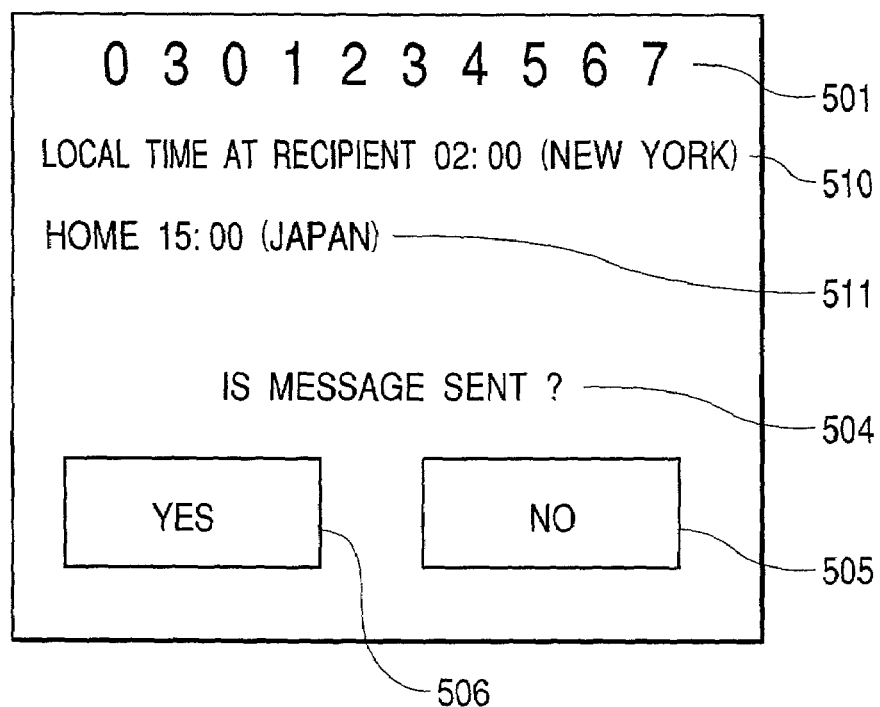
FIG. 10 is a front view showing an example of the display of the cellular phone according to the third embodiment of the present invention.

A third embodiment of the present invention is described using FIGS. 8 to 10. This embodiment performs the processing that acquires the position information of the receiving end instead of acquiring the time information of the receiving end in the first embodiment. An example of the procedure until the mobile unit 1 displays the local time at the mobile unit 2 is described using FIGS. 8 and 9. When the mobile unit 1 sends a message to the mobile unit 2, the user enters the telephone number of the mobile unit 2 from the operation unit 107 or calls it if it is previously stored in the storage unit 108 (step 610), and then the dialing button 184 installed in the operation unit is pressed (step 611). To perform calling processing, the control unit of the mobile unit 1 performs the processing that requests the base station B at which the mobile unit 2 that is the receiving end to return the position information of the base station B instead of immediately connecting to the mobile unit 2 (step 604). In this embodiment, the transmitting unit of the base station B has the function that sends the position information of this base station to the requesting source when it is requested from the calling end. The base station B that receives this request returns the position of the local station to the mobile unit 1 that is the requesting source (step 623). Hereupon, the position information the base station B returns may be wide-area information, such as a country, an area or a name of a city. The mobile unit 1 that acquires (step 629) the position information of the base station at which the cellular phone of the receiving end is registered is controlled by the control unit 110 so as to calculate the time of the receiving end (steps 624 and 631) using the lookup table in which the correspondence between the position of the base station of the receiving end previously stored in the storage unit 108 and the time difference between the time zones are collected and the time represented by the clock circuit 109 of the local station. The control unit 110 of the mobile unit 1 performs control so as to display the selection screen that selects whether to send a message or not on the display unit 106 after the local time at the receiving end is displayed (steps 625 and 632). The user of the mobile unit 1 inputs whether to send a message to the mobile unit 2 or not as is using the operation unit 107 (step 633). When the user of the mobile unit 1 decides calling (step 633-Y), the control unit of the mobile unit 1 performs the processing that requests the base station B at which the mobile unit 2 that is the receiving end is registered to connect to the mobile unit 2 (step 626). The base station B that receives this request performs calling processing to the mobile unit 2, and performs the processing that connects a mobile unit line so as to start a call with the mobile unit 1 (step 628) when an incoming response is made from the mobile unit 2 (step 627). The above processing procedure in the mobile unit is stored in the storage unit 108, and the control unit 110 calls this procedure and executes the processing.

FIG. 9 is a drawing showing an example of the processing of the mobile unit 1. The mobile unit 1 acquires the position information of the receiving end from the base station B (step 629) and decides whether the time zone of the base station B matches the time zone of the local station (step 630). As a result of the decision, when the time zone does not match that of the time zone (step 630-N), the mobile unit 1 is controlled by the control unit 110 so as to calculate the time information of the receiving end (step 631) using the acquired position information, the lookup table in which the correspondence between the position of the base station of the receiving end previously stored in the storage unit 108 and the time difference between the time zones are collected and the time represented by the clock circuit 109 of the local station.

The calculated time of the recipient is displayed on the display unit 106 of the cellular phone as shown in FIG. 10 (step 632). In the example of FIG. 10, in addition to the recipient's telephone number 501 and the time 511 of the local station, the local time 510 of the recipient to which the position information (city name in the drawing) acquired from the base station B that registers the connected recipient is added is also displayed. When the decision of the following steps 633, 634, and 630 is Y, the description is omitted since the description is identical with that of the first embodiment. According to this embodiment, since the same effect as the first embodiment is obtained and the user of the cellular phone can also specify the area of the recipient before connecting communication, more detailed information can be offered to the user.

Figure 11:
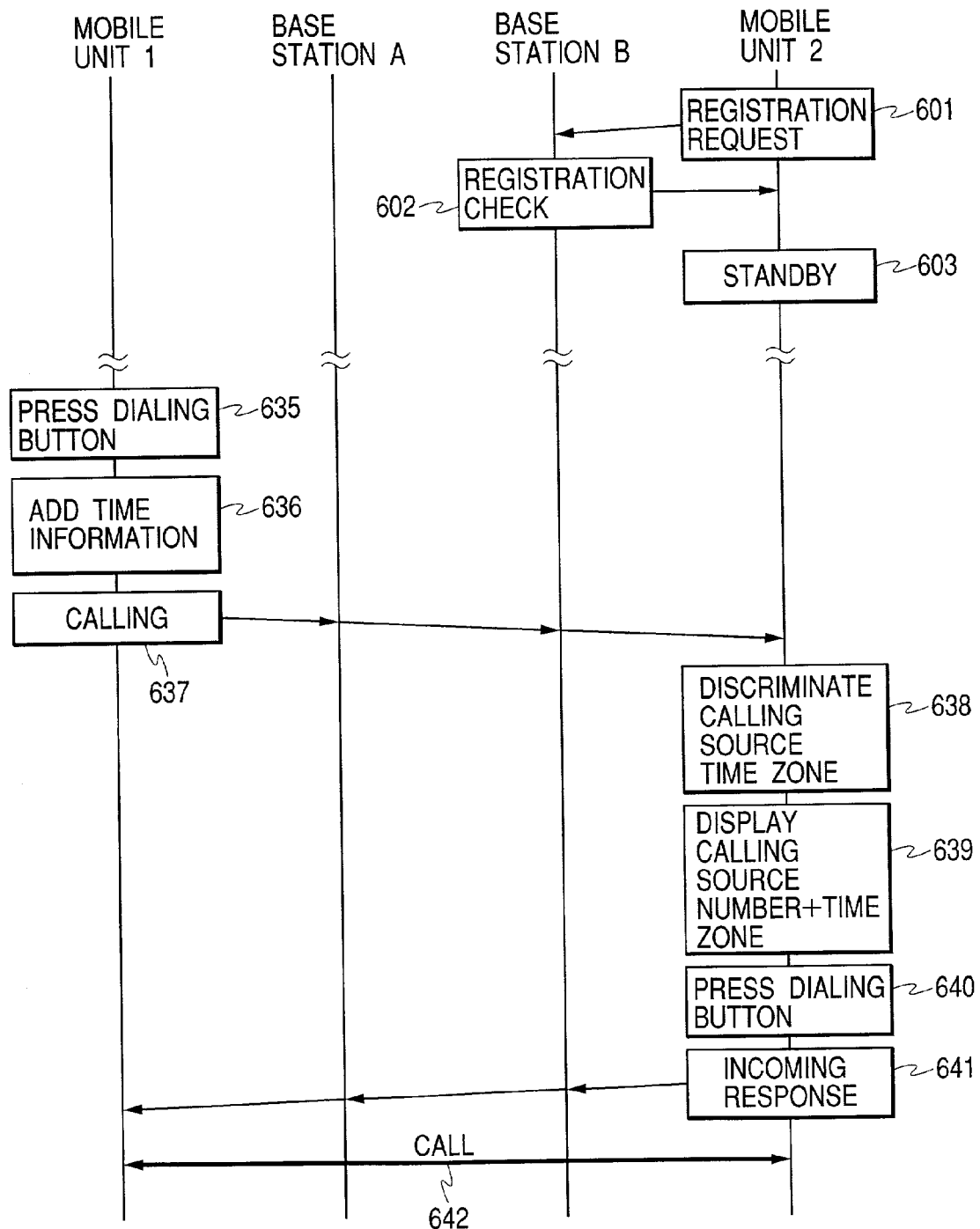
FIG. 11 is a sequence diagram showing an example of the operation according to a fourth embodiment of the present invention.
Figure 12:
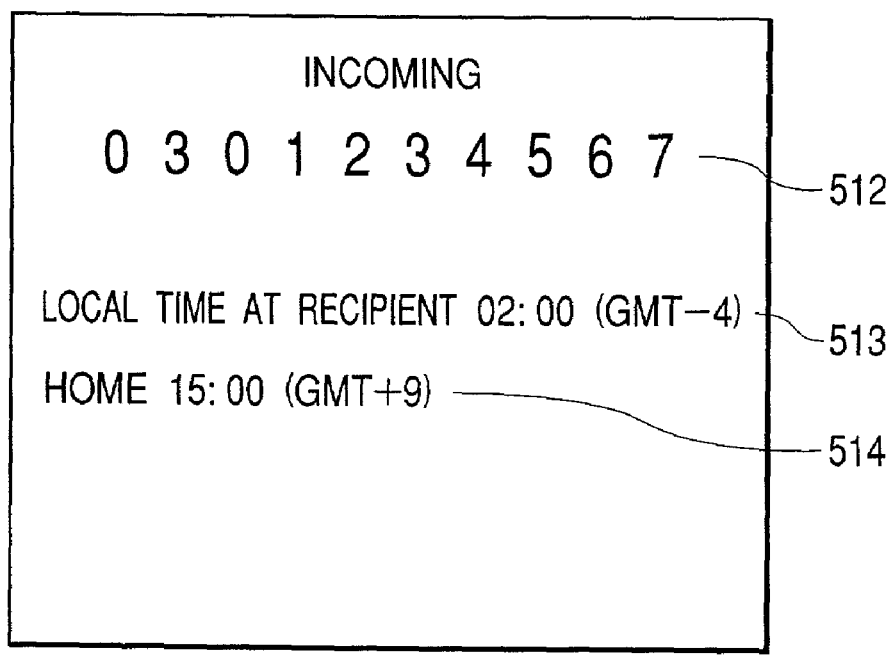
FIG. 12 is a front view showing an example of the display of the cellular phone according to the fourth embodiment of the present invention.

A fourth embodiment of the present invention is described using to FIGS. 11 and 12. FIG. 11 is a drawing showing the operation of the cellular phone and base station in this embodiment. In the third embodiment, the cellular phone at the caller end displays the local time at the recipient end. On the contrary, in this embodiment, the time information at the caller end is displayed on the cellular phone at the recipient end. Now, when the mobile unit 1 sends a message to the mobile unit 2, the case where the local time at the mobile unit 1 that is the calling end is displayed on the display unit of the mobile unit 2 is described using FIG. 11. First, to send a message, the mobile unit 1 at the calling end is controlled by the control unit 110 so as to add the time information obtained from the clock circuit 109 installed in the local station to the message and send it to the receiving end (steps 635 to 637). The mobile unit 2 that receives the information controls the following processing by the control unit installed in the same manner as the mobile unit 1. In the beginning, the time information at the calling end is extracted from the received information and the time at the calling end is calculated using the lookup table in which the time difference between the time zones previously stored in the storage unit that is provided in the same manner as the mobile unit 1 and the clock represented by the clock circuit of the local station (step 638). Next, the calculated time at the caller end and an caller number are displayed on the display unit (step 639). When the dialing button 184 is pressed by the user of the mobile unit 2 who checks this display (step 640), incoming response processing is performed (step 641) and the processing moves to the call operation (step 642).

FIG. 12 shows an example of the incoming display screen in the cellular phone of this embodiment. "Incoming" is displayed on the display screen. Subsequently, the display (513) of the local time at the caller and the time display (514) of the local station are performed together with the display (512) of the caller number. Accordingly, it can be known before a call is started that the caller places the call in what conditions.

According to this embodiment, since the user of the cellular phone can know the local time at the caller when a message is received, the conditions of the caller can be guessed before the call is started and consideration for the scene at which conversation and business are conveyed can smoothly be performed.

Further, in the above embodiment, the base station is requested to send the time information or position information at the position where the base station of the recipient exists. Software that receives this time information or position information and calculates and displays the local time at the recipient is stored in a cellular phone. The manufacturer of the cellular phone stores this software in its own cellular phone and may also use it exclusively. However, to spread this system, it needs to be used widely in both its own products and other companies' products. Accordingly, when this software is distributed via the Internet and downloaded to the cellular phone, accounting may be performed to the user as download rates. Further, the download rates are made free of charge and the accounting may also be performed every time this software is executed. In either case as the accounting, the download rates are claimed from the user so that they may be added to cellular phone rates and collected from his or her bank account from which the cellular phone rates are withdrawn. When this business company is a carrier, the download rates are claimed by being added to the cellular phone rates and may be withdrawn from the bank account. If this business company is not a carrier, the business company gets the carrier to collect the download rates, and subsequently, may get the carrier to transfer the rates regarding the download or execution of software to the bank account of the business company. In this case, the carrier may also claim brokerage from the business company and this gives birth to trade that pays for the carrier, too.

Figure 14:
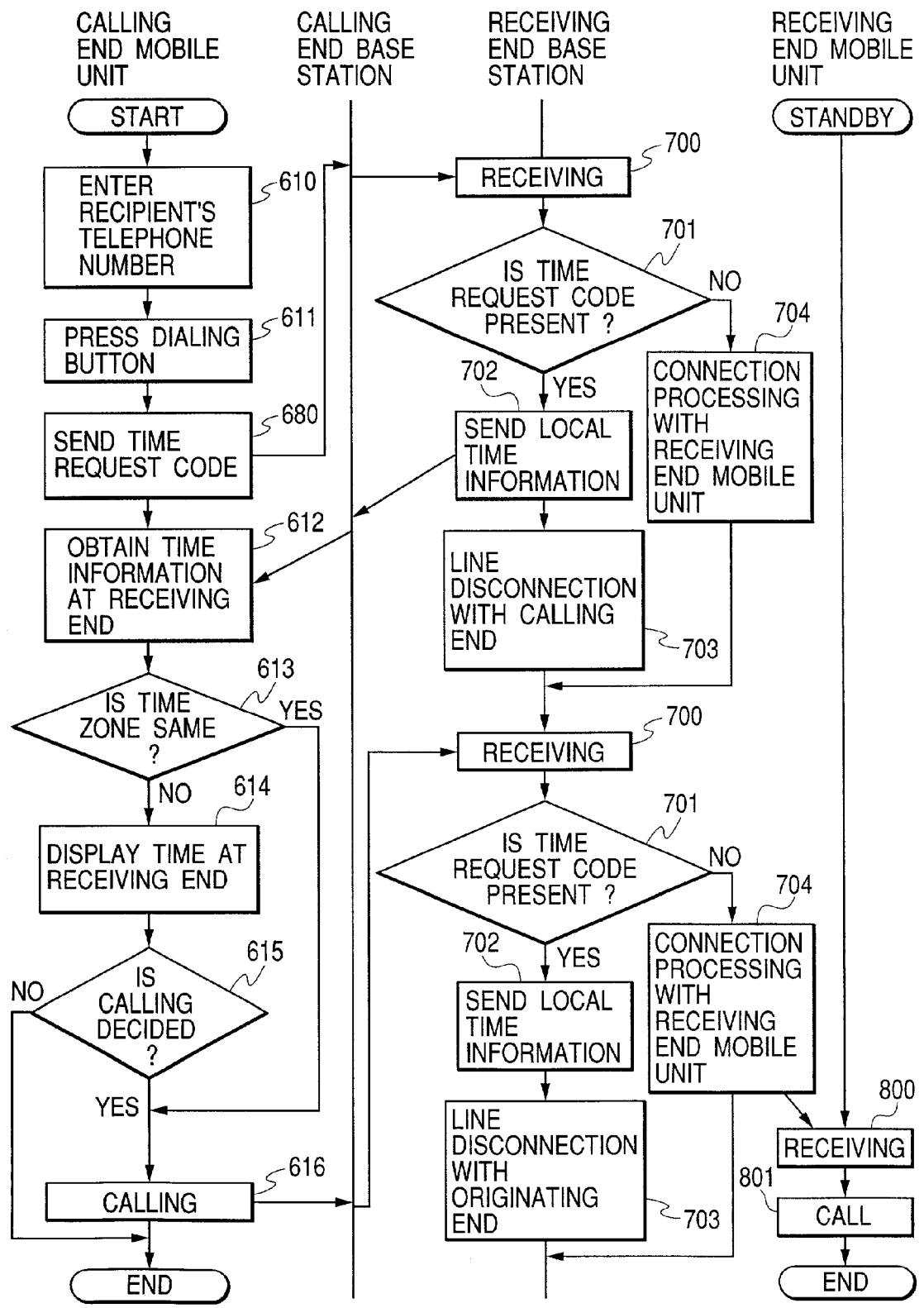
FIG. 14 is a flowchart showing an example of the operation of the cellular phone or a base station according to a fifth embodiment of the present invention.
Figure 15:
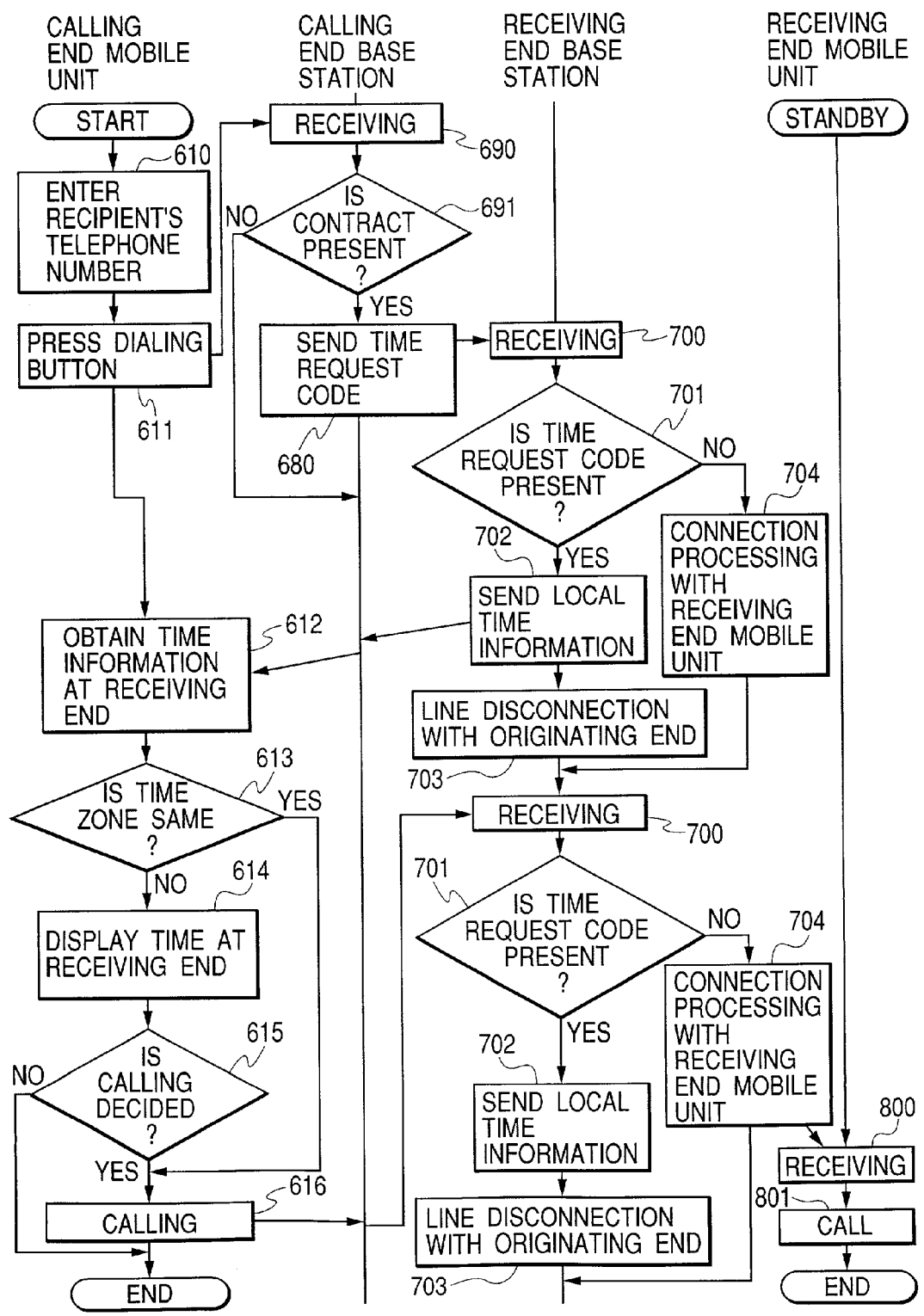
FIG. 15 is a flowchart showing another example of the operation of the cellular phone or base station according to the fifth embodiment of the present invention.

A fifth embodiment of the present invention is described using FIGS. 14 and 15. In this embodiment, a time request code is sent from the calling end to the base station at the receiving end. When the base station at the receiving end receives the time request code, the processing that returns the time or position information. After the calling end checks the local time and decides calling, connection is performed to the receiving end mobile unit. Accordingly, the mobile unit at the receiving end avoids ringing an incoming tone at the stage of checking the time check. The time request code can be assigned to the mobile unit of the caller as shown in FIG. 14. Otherwise, as shown in FIG. 15, an caller and a carrier concludes a contract. If a call-out is issued from this caller, a request code may also be added and sent at the base station end at which the mobile unit of the caller is connected.

A concrete description is given below. First, the operation of the user is basically the same operation method as described in FIG. 3. Also in FIGS. 14 and 15, the same step number is added to the same step. The user enters the telephone number of the recipient at the mobile unit at the calling end (step 610) and subsequently, the dialing button is pressed (step 611). When a time request code is assigned to the mobile unit of the caller, as shown in FIG. 14, the time request code is sent from the mobile unit at the calling end together with the telephone number of the recipient (step 680) and received by the base station at the receiving end via the base station at the calling end (step 700). On the other hand, when the time request code is added and sent at the base station end to which the mobile unit of the caller is connected, as shown in FIG. 15, the telephone number of the recipient is received by the base station at the receiving end (step 690). For a cellular phone, the information that identifies the mobile unit at the calling end (for example, the telephone number at the calling end, an ID number or the like assigned when various services are used) (hereinafter referred to as mobile unit identification information) is sent together with the telephone number of the recipient. Also in this embodiment, this mobile unit identification information is sent to the base station at the receiving end and the base station at the calling end decides whether there is a contract between the caller and carrier (step 691) from this mobile unit identification information. When there is a contract, the time request code is sent to the base station at the receiving end together with the telephone number of the recipient at the base station end (step 680).

The subsequent steps are common in FIGS. 14 and 15. The base station at the receiving end receives a signal sent from the base station at the calling end (step 700). Subsequently, whether a time request code is contained in the received signal is decided (step 701). If the time request code is included, the information about the local time or position information (for example, information showing latitude and longitude or wide-area information, such as a country, an area or a name of a city) is sent to the base station at the calling end (step 702) and this time information or position information is sent from the base station at the calling end to the mobile unit at the calling end. After the base station at the receiving end sends the time information or position information, it disconnects the line for the calling end once and enters the stand-by state. On the other hand, when any time request code is not contained, it is decided that a call is started by a usual telephone and the mobile unit at the receiving end is called, and then the line is connected (step 704). When the call terminates, the base station disconnects the line and enters the stand-by state. Subsequently, the steps 700, 701, 702, and 703 or the steps 700, 701, and 704 are repeated every time incoming exists in the base station at the receiving end.

When the mobile unit at the receiving end receives the time information or position information (step 612), it decides whether the base station at the caller end and the base station at the recipient end are within the same time zone (step 613). When the time zone differs, the time of the recipient is displayed (step 614) and the user can know the local time at the remote side, and then whether the call is connected or disconnected is decided (step 615). When it is decided that the call is connected, the calling is performed to the recipient (step 616). On the other hand, when the call is disconnected, the calling is not only performed but also the operation terminates.

The signal sent in the step 616 is sent to the base station at the receiving end via the base station at the calling end and received (step 700). Since this signal does not contain the time request code, the base station at the receiving end moves to the step 704 via the step 1 and performs the connection to the mobile unit at the receiving end. Accordingly, the mobile unit at the receiving end receives a signal (step 800) and performs a call for the mobile unit at the receiving end (step 801). When the call terminates, the line is disconnected and the operation terminates.

In this embodiment, when the base station at the caller end and the base station at the recipient end are within the same time zone, a direct call is enabled without displaying the time. Even if the time zone differs, when the time difference is within the predetermined range (for example, less than one hour), the direct call may also be enabled without displaying the time. To allow the user of the mobile unit to receive this service, the user makes an application indicating that the service must be received to the carrier with which the user makes a contract. The carrier registers the application and claims charges for using this service by adding them to the telephone rates of the user. In this embodiment, for the charges, a fixed rate is assumed in the form that how much a monthly rate is, but it is not limited to this. The charge that is proportional to the frequency of use of how much the service is used once or the charge by stages of how much the service is used according to how many times the frequency of use is may also be acceptable. In this case, the step of the use frequency and charge calculation of this service is added after the step 680 of FIG. 15.

Figure 16:
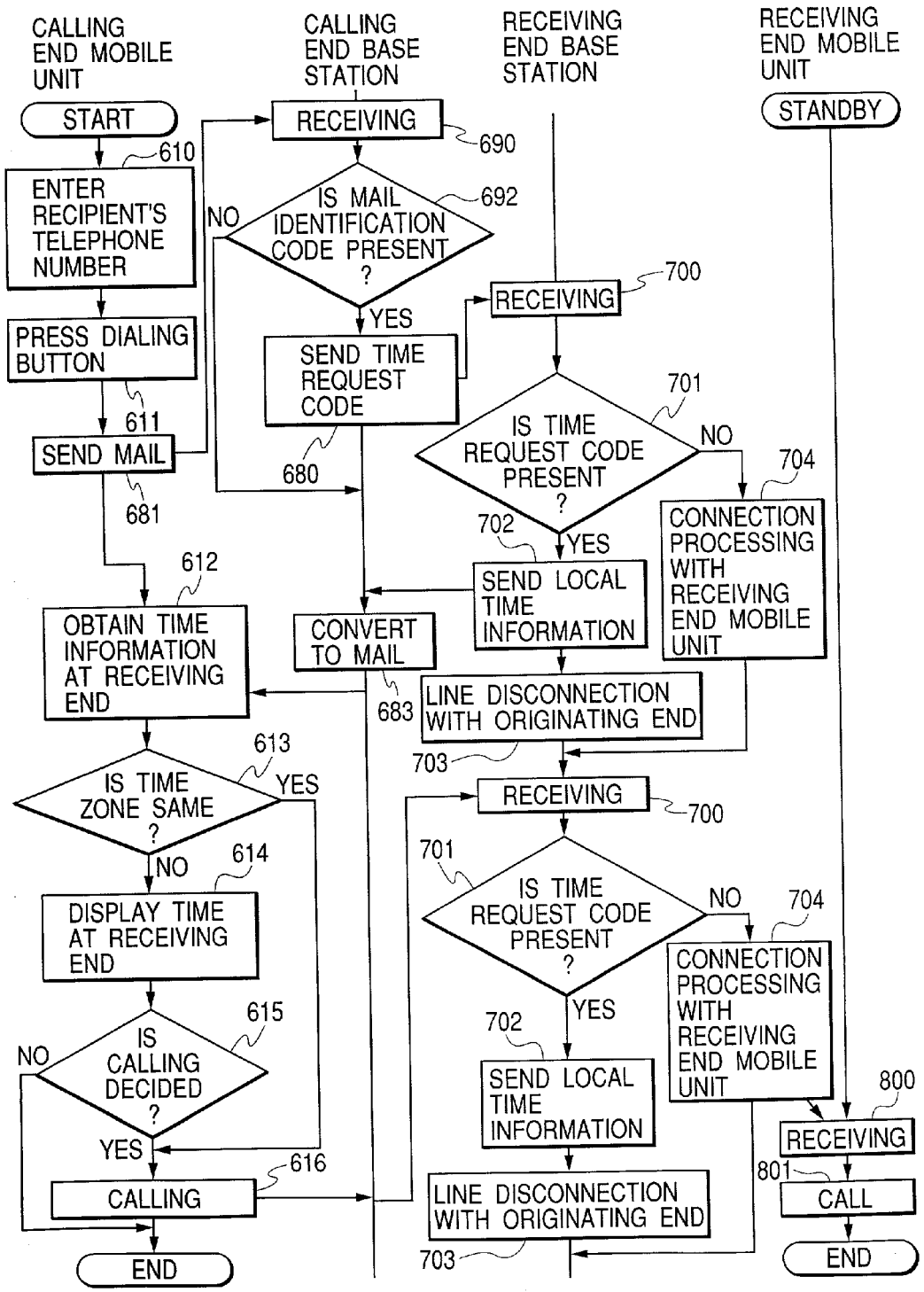
FIG. 16 is a flowchart showing an example of the operation of the cellular phone or base station according to a sixth embodiment of the present invention.

A sixth embodiment of the present invention is described using FIG. 16. This embodiment uses mail in the return of the time. That is, when the calling end requests the time by mail, the time is returned from the receiving end by mail. This mail uses a mail using a telephone number as an address (hereinafter referred to as short mail). Although the short mail is restricted in that the number of characters that can be sent in alphanumeric mode is 100 characters, this restriction will not prevent the time from being sent as character data. In this case, the short mail is sent by adding an identification code (hereinafter referred to as mail identification code) so as to be discriminated from normal mail. The receiving end automatically returns the time or position information by short mail when the base station or mobile unit detects this mail identification code. This mail identification code is assigned to the mobile unit for which this service contract is concluded with the carrier. At this time, it takes much time and is not practical that the calling end creates the time request mail for each calling and sends the mail by adding the mail identification code. Accordingly, in this embodiment, the time request function is assigned to one of the function keys 180 to 182. For example, when the function key 181 is assigned as the time request key and the function key 181 is pressed in short mail mode, a command that requests the time or position information of the base station at the receiving end is sent by mail together with the identification code. Since this command is read by the machine of the base station at the receiving end, it may be machine language.

FIG. 16 is the same as FIG. 15 in the basic part. The part that differs from FIG. 15 is mainly described below. In this embodiment, when the dialing button (function key 181) is pressed in the step 611, the short mail including the command that requests the time or position information of the base station at the receiving end is sent from the mobile unit at the calling end to the base station at the calling end with a mail identification code added (step 681). After the base station at the calling end receives the mail, it decides whether the mail identification code is contained (step 692). When the mail identification code is contained, the time request code is sent to the base station at the receiving end (step 680). Accordingly, when the local time information is sent (step 702) from the base station at the receiving end, the base station at the receiving end converts this information to short mail and is sent to the mobile unit at the calling end (step 683). The same description of FIG. 15 in the fifth embodiment is applied to another step.

In the above embodiment, the mobile unit 1 at the calling end is not limited to a telephone that sends a message via a public network or a public line, and may also use a mobile unit that is provided with the connection function to the Internet and can send the message via the Internet.

What is claimed is:

1. A method for operating a cellular phone for making a call comprising:
   receiving in the cellular phone information related to a local time of a receiving end from a cellular phone that is at the receiving end or from a base station configured to register the cellular phone that is at the receiving end;
   acquiring in the cellular phone local time of the receiving end based on the received information;
   deciding in the cellular phone whether a time zone of the receiving end matches a time zone of the transmitting end based on the acquired local time;
   informing a user via the cellular phone of the acquired local time or the time zone of the receiving end if the receiving end and the transmitting end are in different time zones;
   displaying the acquired local time on a display of the cellular phone
   displaying a plurality of communication modes on the display if the receiving end and the transmitting end are in different time zones, the plurality of communication modes include a mail mode and/or a message mode; and
   performing call processing in the cellular phone if the receiving end and the transmitting end are in the same time zone.

2. The method according to claim 1, wherein the plurality of communication modes includes a call mode.

3. The method according to claim 1, wherein the acquired local time is audibly presented by a speaker of the cellular phone.

4. The method according to claim 1, further comprising performing call processing in the cellular phone if a call request is input after the acquired local time or the time zone of the receiving end is presented.

\* \* \* \* \*